United States Patent
Lee et al.

(10) Patent No.: US 7,133,196 B1
(45) Date of Patent: Nov. 7, 2006

(54) ERBIUM DOPED FIBER AMPLIFIER FOR REDUCING TRANSIENT PHENOMENA OF OSNR AND BER IN DYNAMIC WDM SYSTEM AND AMPLIFYING METHOD THEREOF

(75) Inventors: Won Kyoung Lee, Daejeon (KR); Heuk Park, Daejeon (KR); Kwang Joon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/320,418

(22) Filed: Dec. 27, 2005

(30) Foreign Application Priority Data

Sep. 27, 2005 (KR) ...................... 10-2005-0089808

(51) Int. Cl.
*H01S 3/00* (2006.01)
(52) U.S. Cl. .................................... 359/337.4
(58) Field of Classification Search ................ 359/337, 359/337.4, 341, 41, 341.1
See application file for complete search history.

(56) References Cited

U.S. PATENT DOCUMENTS 6,353,496 B1    3/2002    Jung et al.
6,888,670 B1 *  5/2005    Oh et al. ..................... 359/334

FOREIGN PATENT DOCUMENTS

JP    2000162547 A   *  6/2000

OTHER PUBLICATIONS

Kuniaki Motoshima, et al., "A Channel-Number Insensitive Erbium-Doped Fiber Amplifier With Automatic Gain and Power Regulation Function", Journal of Lightwave Technology, vol. 19, No. 11, Nov. 2001 (pp. 1759-1767).

* cited by examiner

*Primary Examiner*—Mark Hellner
(74) *Attorney, Agent, or Firm*—Blakely Sokoloff Taylor & Zafman

(57) ABSTRACT

Provided is an erbium-doped fiber amplifier reducing transient phenomena of a signal-to-noise ratio and a bit error rate in a dynamic wavelength division multiplexing system and an amplifying method using the erbium-doped fiber amplifier. The erbium-doped fiber amplifier includes: a polarization scrambler modulating a polarization state of an input signal to remove a polarization of the input signal; an amplifier amplifying the input signal from which the polarization has been removed; a detector reading powers of input and output signals of the amplifier; and an automatic gain controller controlling currents of the pump LDs according to the powers of the input and output signals read by the detector 1630 to maintain the gain even if the power of input signal changes.

5 Claims, 9 Drawing Sheets

ERBIUM DOPED FIBER AMPLIFIER FOR REDUCING TRANSIENT PHENOMENA OF OSNR AND BER IN DYNAMIC WDM SYSTEM AND AMPLIFYING METHOD THEREOF

CROSS-REFERENCE TO RELATED PATENT APPLICATION

This application claims the benefit of Korean Patent Application No. 10-2005-0089808, filed on Sep. 27, 2005, in the Korean Intellectual Property Office, the disclosure of which is incorporated herein in its entirety by reference.

BACKGROUND OF THE INVENTION

1. Field of the Invention

The present invention relates to an erbium-doped fiber amplifier (EDFA) for reducing transient phenomena of an optical signal-to-nose ratio (SNR) and a bit error rate (BER) in a dynamic wavelength division multiplexing (WDM) system and an amplifying method thereof.

2. Description of the Related Art

WDM systems have been evolved into intelligent dynamic WDM systems attributed to efficiency, flexibility, and reliability. In a case where obstacles are put in the way of arbitrary paths of dynamic WDM systems into which optical add drop multiplexer (OADM) and optical cross connect (OXC) are integrated, paths of channels are changed to re-allocate channels or to insert new channels. Thus, the number of input channels and a total input power of an EDFA vary depending on states of nodes and paths.

A sudden variation of the number of input channels affects a gain of the EDFA and thus affects powers, OSNRs, and BERs of remaining channels. As a result, the performance of the EDFA may be deteriorated. To solve this problem, there is suggested a technique for adjusting the currents of pump LDs depending on the input power of an EDFA to keep up a gain. However, the technique cannot entirely remove transient phenomena of the OSNR and the BER.

SUMMARY OF THE INVENTION

The present invention provides an EDFA for reducing transient phenomena of a power, an OSNR, and a BER caused by a variation in the number of input channels or the total input power of the EDFA.

According to an aspect of the present invention, there is provided an erbium-doped fiber amplifier including: a polarization scrambler modulating a polarization state of an input signal to depolarize a polarization of the input signal; an amplifier amplifying the input signal from which the polarization has been removed; a detector reading an input power and an output power of the amplifier; and an automatic gain controller controlling the currents of pump LDs based on the input power and output power so as to uniformly maintain a gain of the amplifier.

The amplifier may include: a dispersion compensating fiber inserted between two gain blocks so as to compensate for dispersion.

The amplifier may have a gain of 25 dB or more, an output power of 23 dBm or more, and a gain flatness of 1 dB or less.

The automatic gain controller may control currents of pump laser diodes of the amplifier.

According to another aspect of the present invention, there is provided an amplifying method using an erbium-doped fiber amplifier, including: removing a polarization of an input signal by modulating a polarization state of the input signal; amplifying the input signal from which the polarization has been removed; detecting input power and output power; and controlling the ratio of the input and output powers so as to uniformly maintain the gain.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
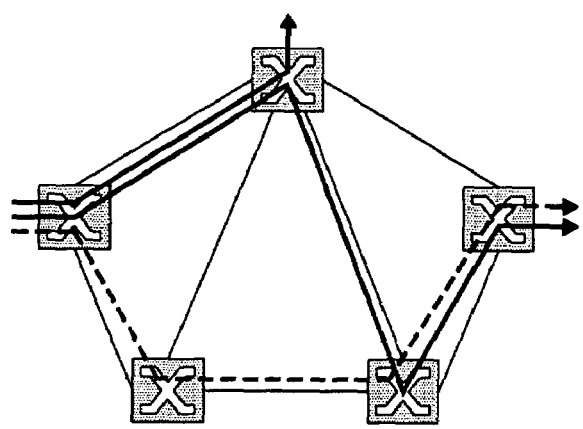
FIG. 1 is a view illustrating a dynamic wavelength division multiplexing (WDM) system in which an optical add drop multiplexer (OADM) and optical crossing connect (OXC) are integrated into a WDM.

The present invention will now be described more fully with reference to the accompanying drawings, in which exemplary embodiments of the invention are shown. Like reference numerals in the drawings denote like elements, and thus their description will be omitted.

When it is determined that the detailed description of related known functions or structures makes the present invention unclear, the detailed description will be omitted.

FIG. 1 is a view illustrating a dynamic WDM system in which OADM and OXC are integrated.

WDM systems have been developed into intelligent dynamic WDM systems in terms of efficiency, flexibility, and reliability.

In a case where obstacles are put in the way of arbitrary paths of dynamic WDM systems, paths of channels are changed to re-allocate channels or insert new channels. Thus, the number of input channels and a total input power of an EDFA vary depending on states of nodes and paths.

Sudden variations in the number of channels and the number of paths in such a dynamic WDM system affect a gain of the EDFA, and thus a transient phenomenon occurs in an output power of a remaining channel. This transient behavior affects not only the power but also the OSNR and the BER. As a result, the performance of the EDFA may be deteriorated.

Figure 2:
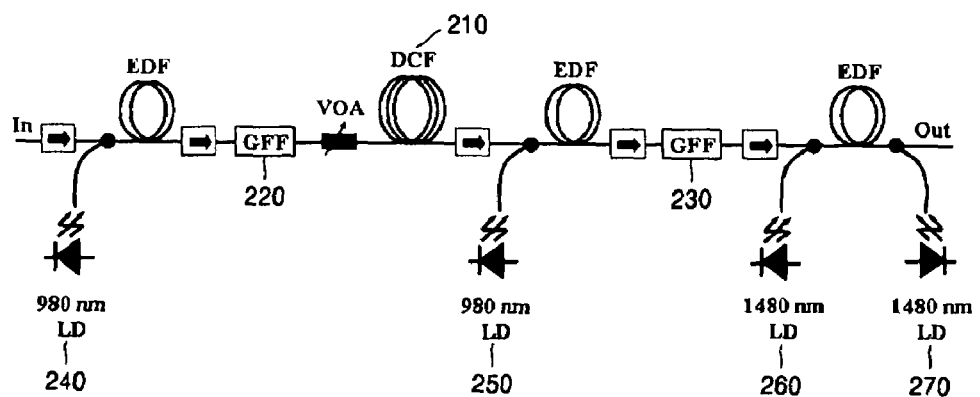
FIG. 2 is a view illustrating a structure of high-power EDFA removing transient phenomena of output powers of remaining channels.

FIG. 2 is a view illustrating a structure of an EDFA according to a preferred embodiment of the present invention.

The EDFA according to the preferred embodiment of the present invention has two gain blocks to lower a noise figure and increase a power. A dispersion compensating fiber (DCF) 210 is inserted between the two gain blocks to compensate for dispersion.

Gain flattening filters (GFFs) 220 and 230 are inserted within the first and second gain blocks to flatten a gain spectrum.

A pump laser diode of 980 nm is excited (240) forward in the first gain block, and a pump laser diode of 980 nm is excited (250) forward and two pump laser diodes of 1480 nm are excited (260 and 270) bi-directionally in the second gain block.

The EDFA having the structure shown in FIG. 2 has features such as a gain of more than 25 dB, a power of more than 23 dBm, and a gain flatness of less than 1 dB.

Figure 3:
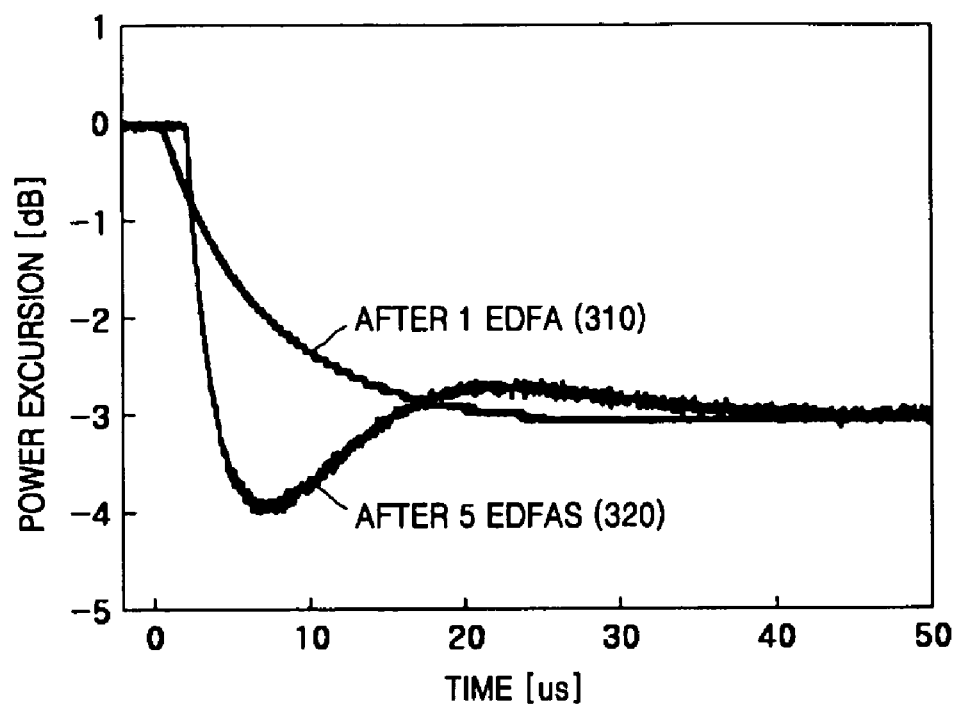
FIG. 3 is a graph illustrating a transient behavior of an output power for a remaining channel when 20 channels out of 40 channels (corresponding to 3 dB) are added to an erbium doped fiber amplifier (EDFA)
Figure 4:
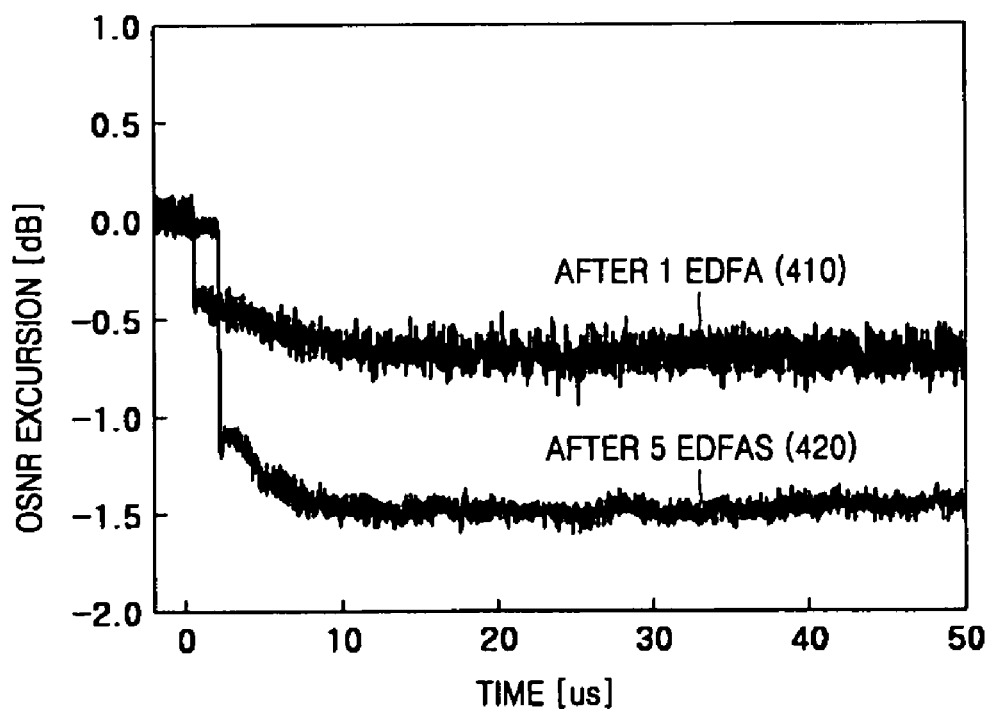
FIG. 4 is a graph illustrating a transient behavior of an OSNR for the remaining channel when 20 channels out of 40 channels (corresponding to 3 dB) are added to an erbium doped fiber amplifier (EDFA)
Figure 5:
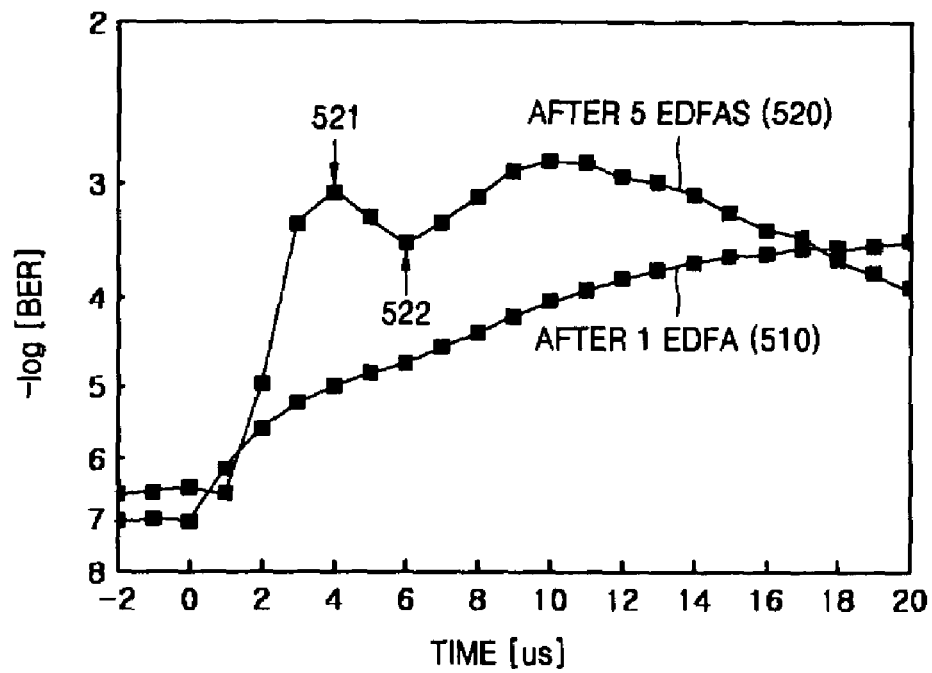
FIG. 5 is a graph illustrating a transient behavior of a BER for the remaining channel when 20 channels out of 40 channels (corresponding to 3 dB) are added to an erbium doped fiber amplifier (EDFA)

FIGS. 3 through 5 are graphs illustrating transient behavior of an output power, an OSNR, and a BER with respect to a variation in the number of input channels when 1 to 5 high power EDFAs having the structure as shown in FIG. 2 are connected to one another.

Here, an input power is periodically changed into 3 dB using an acosto-optic modulator (AOM). Also, currents of 4 pump laser diodes are constantly maintained regardless of the input power.

FIG. 3 is a graph illustrating a power transient of a remaining channel occurring when input channels of an EDFA are added by 3 dB.

As shown in FIG. 3, the power variation 310 of a remaining channel is about 3 dB after an EDFA. The power variation 320 of the remaining channel is about 4 dB after five EDFAs.

FIG. 4 is a graph illustrating an OSNR transient of a remaining channel occurring when input channels of an EDFA are added by 3 dB.

As shown in FIG. 4, the OSNR 410 is fluctuated from about 0.5 dB to 0.8 dB after an EDFA. An OSNR 420 is fluctuated by 1.5 dB (420) after five EDFAs.

FIG. 5 is a graph illustrating a BER transient of a remaining channel when input channels of an EDFA are added by 3 dB.

As shown in FIG. 5, the BER 520 is fluctuated from about $10^{-7}$ to $10^{-3}$ after five EDFAs and has two peaks 521 and 522 on the graph. The first peak 521 is caused by the variation in the OSNR, and the second peak 522 is caused by the variation in the output power.

Figure 6A:
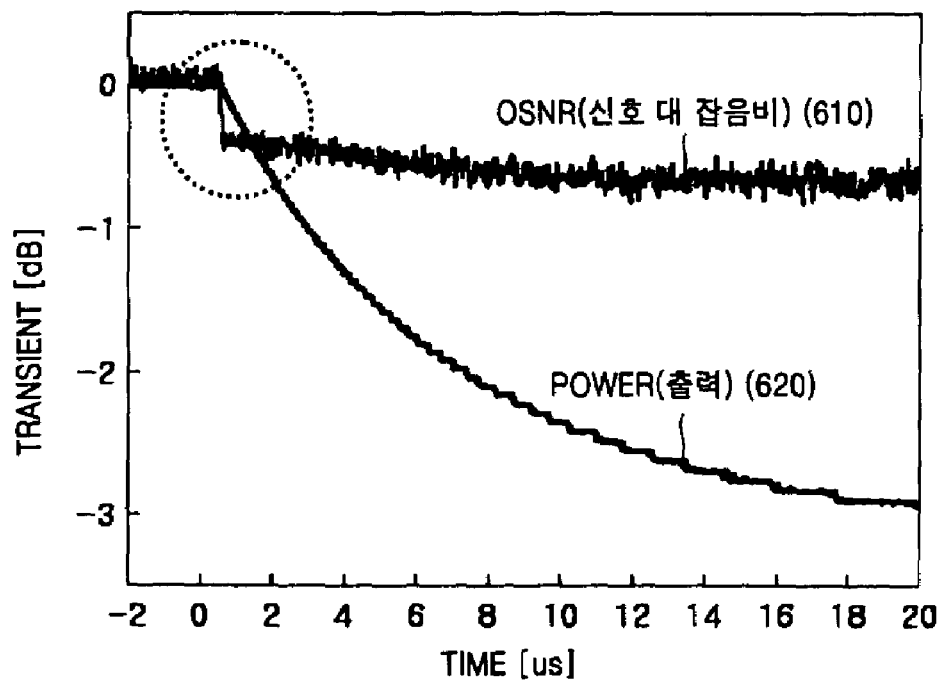
FIGS. 6A and 6B are graphs comparing the OSNR transient with the power transient of the remaining channel after an EDFA and five EDFAs, respectively.
Figure 6B:
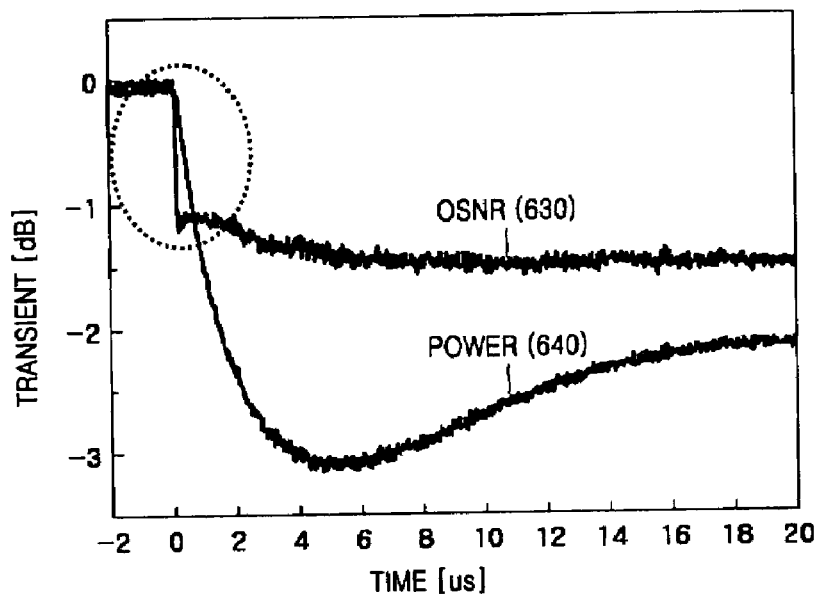

FIGS. 6A and 6B are graphs comparing an OSNR transient with an output power transient after an EDFA and five EDFAs when input channels of an EDFA are added by 3 dB.

As shown in FIGS. 6A and 6B, a variation in an OSNR 610 is greater than a variation in a power 620 at a time before 2 µs and a variation in an output power 640 is grater than a variation in an OSNR 630 at a time after 2 µs. In other words, an OSNR transient at a time within 2 µs and a power transient of at a time after 2 µs largely affect a BER transient and then induce to generate the two peaks 521 and 522 shown in FIG. 5.

An OSNR may be defined as a difference between an output power of a signal and a power of an ASE and expressed as in Equation below.

$$OSNR[dB] = P_{out}[dBm] - P_{ASE}[dBm]$$

As shown in Equation above, a difference between transient behaviors of the OSNR and the output power means that a transient behavior of the ASE is different from the output power.

Figure 7:
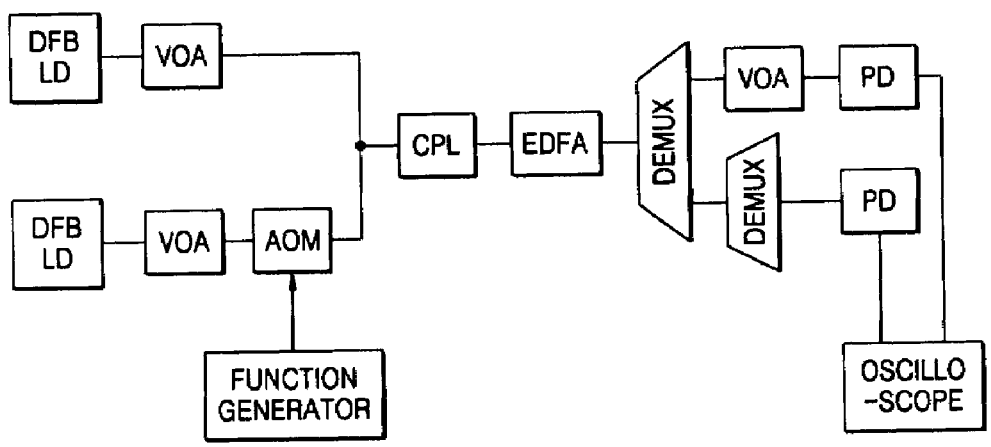
FIG. 7 is a block diagram illustrating a method for measuring a transient behavior of an amplified spontaneous emission (ASE)

FIG. 7 is a block diagram illustrating a method for measuring an ASE transient.

Figure 8:
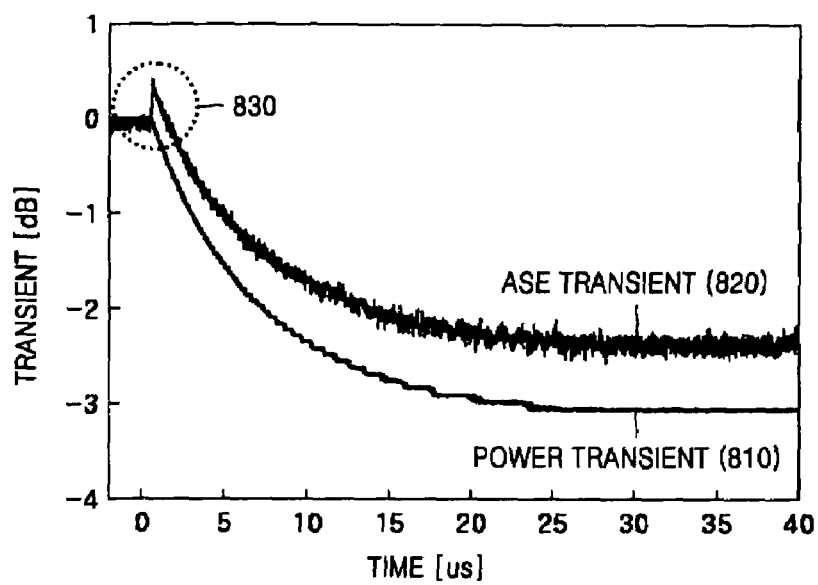
FIG. 8 is a graph comparing the ASE transient with the power transient.

FIG. 8 is a graph comparing an ASE transient with a power transient.

When input channels are added by 3 dB, an output power 810 of a remaining channel decreases monotonically. An ASE power 830 varies wholly less than the output power 810 of the remaining channel but decreases after exceeding 0.5 dB.

Figure 9:
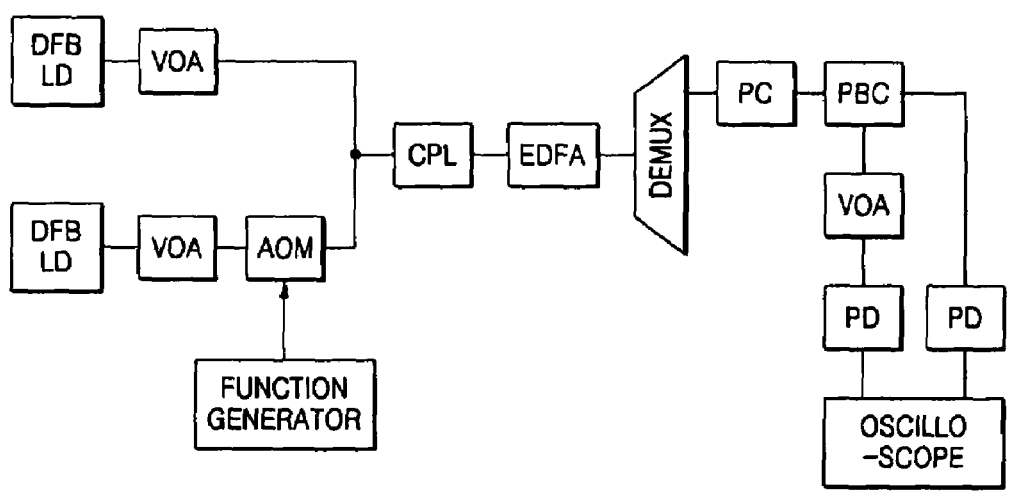
FIG. 9 is a block diagram illustrating a method for measuring a transient behavior of an ASE with respect to each polarization component.

FIG. 9 is a block diagram illustrating a method for measuring an ASE transient with respect to each polarized component to analyze the above result 830.

Figure 10:
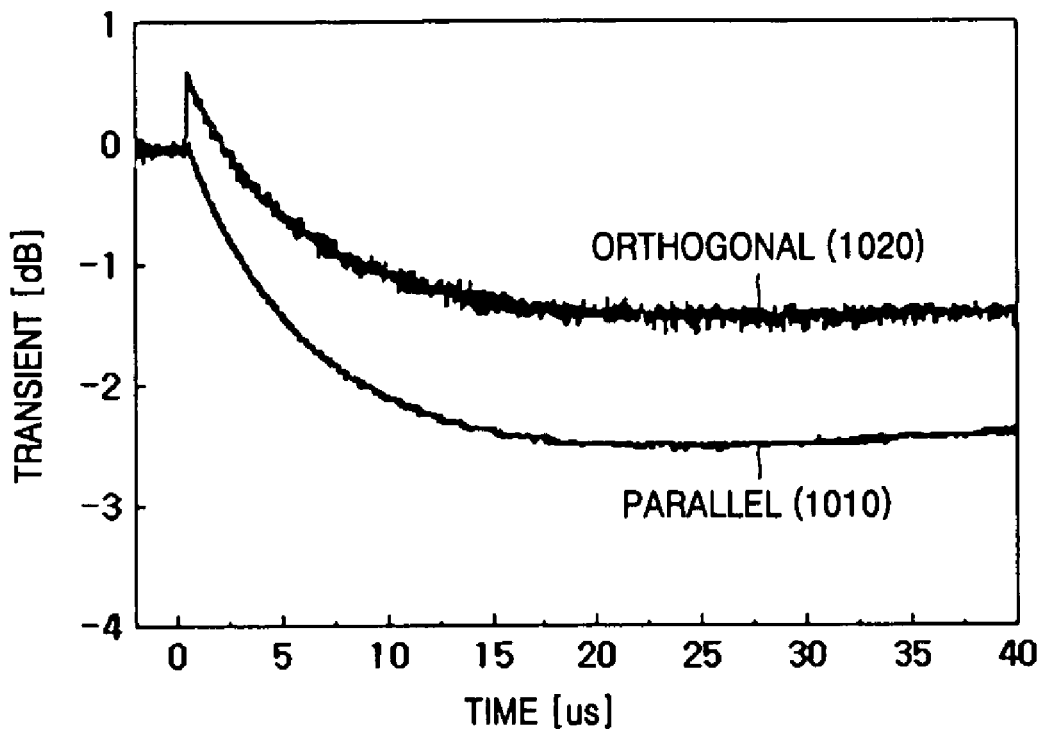
FIG. 10 is a graph illustrating a transient behavior of an ASE with respect to each polarization component after an EDFA when 20 channels out of 40 channels (corresponding to 3 dB) are added to an erbium doped fiber amplifier (EDFA)

FIG. 10 is a graph illustrating an ASE transient with respect to each polarization component after an EDFA when input channels of an EDFA are added by 3 dB.

The transient behavior of an ASE component 1010 having a polarization parallel with an input signal shows a similar behavior to the output power of a remaining channel. However, an ASE component 1020 having a polarization orthogonal to the input signal shows an excess of about 0.5 dB like the ASE transient 820.

Figure 11:
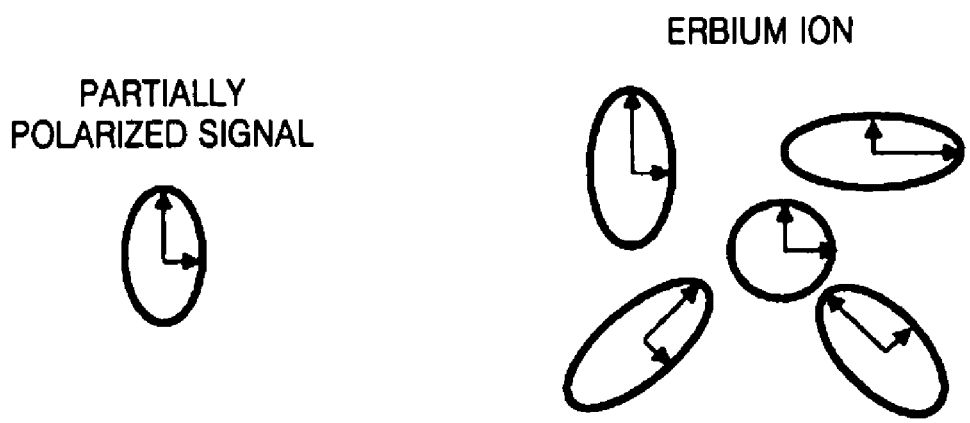
FIG. 11 is view illustrating polarization states of an input signal and erbium ions of an EDF.

FIG. 11 is a view illustrating a polarization state of an input signal and a polarization distribution of erbium ions of an EDF.

As shown in FIG. 11, the input signal is partially polarized, and polarizations of erbium ions of the EDF are randomly disposed. Excitation of the erbium ions varies with a polarized state of the partially polarized input signal.

In other words, the ASE component having the polarization orthogonal to the input signal obtains faster, more gains than the ASE component having the polarization parallel with the input signal. As a result, an excess of an ASE is caused by polarization hole burning (PHB) due to the polarization of the input signal.

Figure 12:
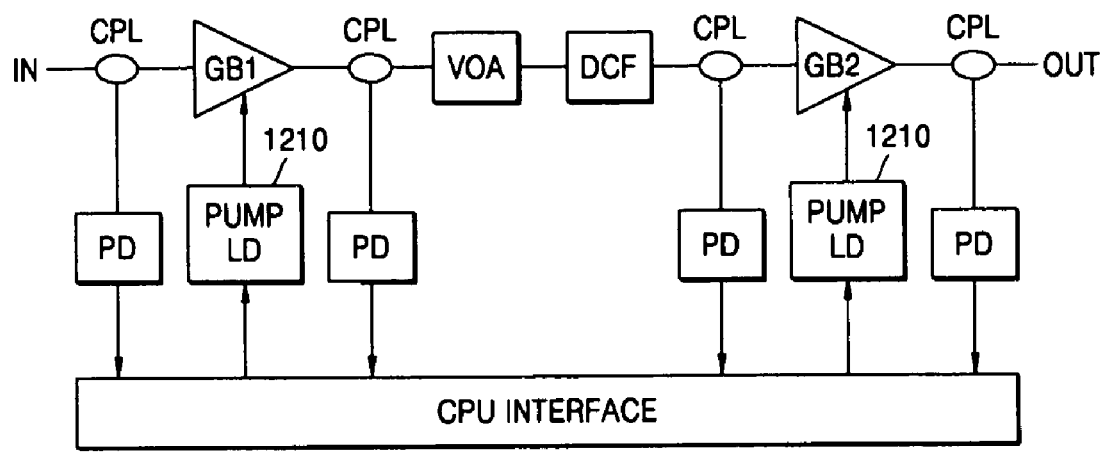
FIG. 12 is a block diagram illustrating a structure adjusting currents of pump laser diodes depending on the input power of an EDFA to reduce the output power transient.

FIG. 12 is a block diagram of a structure adjusting currents of pump laser diodes depending on an input power of an EDFA to reduce an output power transient.

Figure 13:
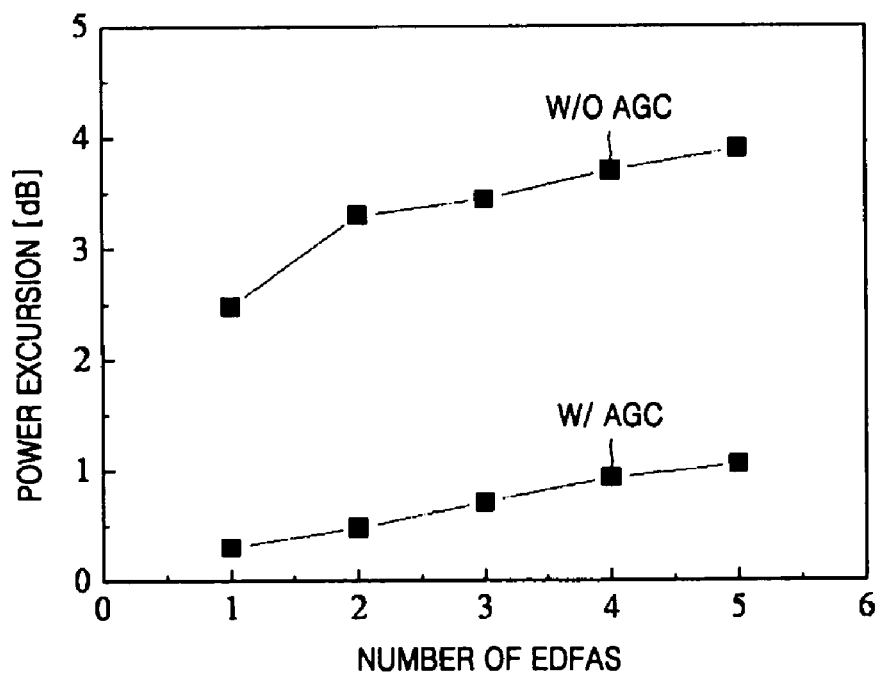
FIG. 13 is a graph illustrating a variation in the output power of remaining channel in the structure shown in FIG. 12.

FIG. 13 is a graph illustrating a variation in the output power in the structure shown in FIG. 12.

An automatic gain controller (AGC) shown in FIG. 12 adjusts currents of pump laser diodes 1210 according to the input power, and then a power transient is reduced by about 3 dB as shown in FIG. 13.

Figure 14:
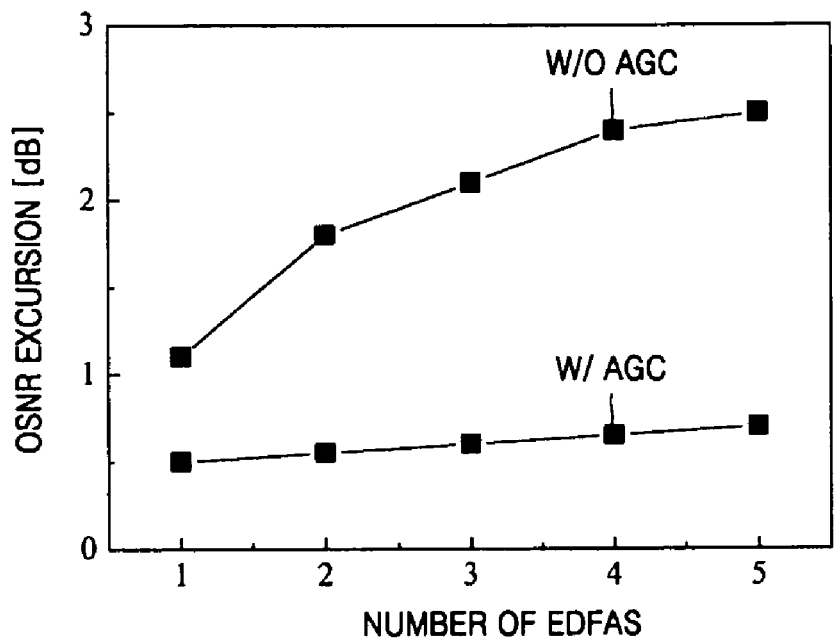
FIG. 14 is a graph illustrating a variation in an OSNR of remaining channel in the structure shown in FIG. 12.

FIG. 14 is a graph illustrating a variation of an OSNR in the structure shown in FIG. 12.

With AGC, an OSNR transient is reduced by 1.8 dB as shown in FIG. 14.

Figure 15:
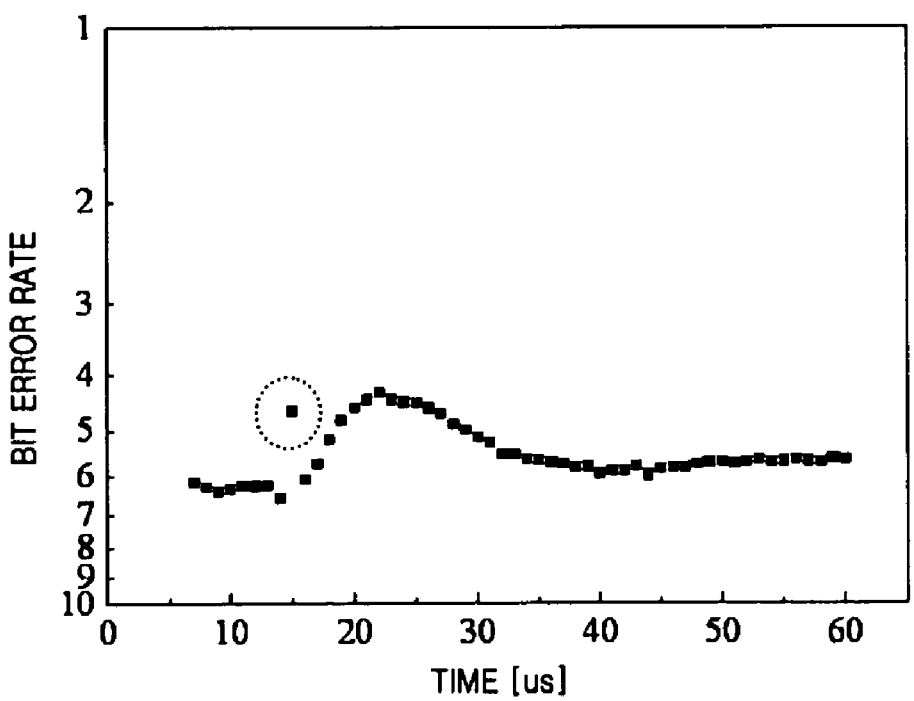
FIG. 15 is a graph illustrating a variation in a BER of remaining channel in the structure shown in FIG. 12.

FIG. 15 is a graph illustrating a variation in a BER in the structure shown in FIG. 12.

With AGC, variation of a BER is lowered from $10^{-3}$ to $10^{-4}$ as shown in FIG. 15. However, two peaks do not still disappear.

Figure 16:
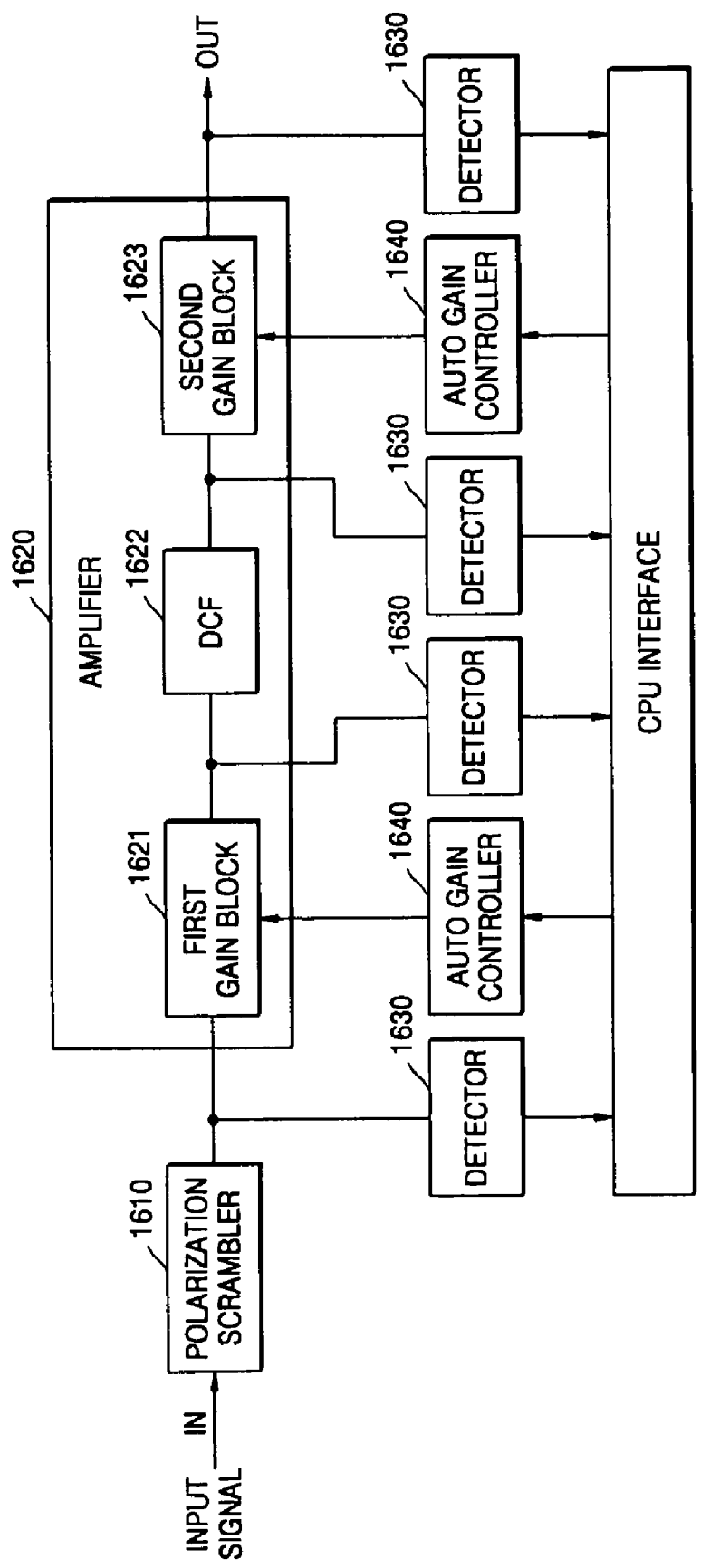
FIG. 16 is a block diagram of an EDFA for reducing transient phenomena of an OSNR and a BER according to an embodiment of the present invention.

FIG. 16 is a block diagram of an EDFA for reducing transient phenomena of an OSNR and a BER.

Referring to FIG. 16, the EDFA includes a polarization scrambler 1610, an amplifier 1620, a detector 1630, and an automatic gain controller 1640. The polarization scrambler 1610 removes a polarization of an input signal by modulating a polarized state of the input signal. The amplifier 1620 amplifies the input signal from which the polarization has been removed. The detector 1630 reads input powers and output powers of the amplifier 1620. The automatic gain controller 1640 controls currents of pump LDs in the amplifier 1620 according to the input powers and output powers so as to uniformly maintain a gain of the amplifier 1620.

The polarization scrambler 1610 removes a polarization of DFB laser diode that is widely used as a source by modulating a polarized state of light. Removing the polarization is called depolarizing or polarization scrambling.

The polarization scrambler 1610 removes a transient phenomenon of the ASE caused by PHB related to the polarization of the input signal. The over-ASE occurs within a very short time of 2 μs as shown in FIG. 8. Thus, a modulation speed of the polarization scrambler 1610 must be more than 10 MHz. For example, a high-speed polarization scrambler LiNbO$_3$(LN) may be used.

The amplifier 1620 amplifies the input signal from which the polarization has been removed by the polarization scrambler 1610. The amplifier 1610 has two gain blocks, for example, an amplifying structure of the EDFA shown in FIG. 2. The amplifier 1620 includes a DCF 1622 inserted between two gain blocks 1621 and 1623 to compensate for a dispersion.

According to a preferred embodiment of the present invention, the amplifier 1620 may have a gain of more than 25 dB, a power of 23 dBm, and a gain flatness of less than 1 dB.

The detector 1630 reads the input powers and output powers of the amplifier 1620 using a photodiode or the like.

The automatic gain controller 1640 controls currents of pump LDs according to the input powers and output powers read by the detector 1630 to maintain the gain even if the power of input signal changes.

As described above, according to the present invention, transient phenomena of a power, an OSNR, and a BER of a remaining channel can be reduced in a dynamic WDM system in which an input power and the number of input channels are changed.

In more detail, peaks appearing in the transient behavior of the BER caused by a variation of 3 dB can be removed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An erbium-doped fiber amplifier comprising:
   a polarization scrambler modulating a polarization state of an input signal to remove a polarization of the input signal, wherein a modulation speed of the scrambler is more than 10 megaHertz to reduce phenomena in output power of an erbium-doped fiber amplifier in a dynamic wavelength division multiplexing system;
   an amplifier amplifying the input signal from which the polarization has been removed;
   a detector reading powers of input and output signals of the amplifier; and
   an automatic gain controller controlling the amplifier according to the powers of the input and output signals read by the detector to maintain a gain even if the power of input signal changes.

2. The erbium-doped fiber amplifier of claim 1, wherein the amplifier comprises:
   two gain blocks and a dispersion compensating fiber inserted between the two gain blocks so as to compensate for a dispersion.

3. The erbium-doped fiber amplifier of claim 1, wherein the amplifier has a gain of 25 dB or more, a power of 23 dBm or more, and a gain flatness of 1 dB or less.

4. The erbium-doped fiber amplifier of claim 1, wherein the automatic gain controller controls currents of pump laser diodes of the amplifier.

5. A amplifying method using an erbium-doped fiber amplifier, comprising:
   removing a polarization of an input signal by modulating a polarization state of the input signal, wherein the input signal is in a dynamic wavelength division multiplexing system where paths of channels are changed to one of (i) reallocating channels or (ii) inserting new channels, thereby causing transient phenomena in Output power of an erbium-doped fiber amplifier in the system;
   amplifying the input signal from which the polarization has been removed;
   detecting powers of input and output signals; and
   controlling a ratio of the powers of the input and output signals so as to uniformly maintain a gain.

* * * * *